United States Patent
Vontell, Sr.

(10) Patent No.: US 8,349,104 B2
(45) Date of Patent: Jan. 8, 2013

(54) METHOD AND ASSEMBLY FOR VALIDATING BOND LINE

(75) Inventor: John H. Vontell, Sr., Manchester, CT (US)

(73) Assignee: United Technologies Corporation, Hartford, CT (US)

(*) Notice: Subject to any disclaimer, the term of this patent is extended or adjusted under 35 U.S.C. 154(b) by 1006 days.

(21) Appl. No.: 12/220,032

(22) Filed: Jul. 21, 2008

(65) Prior Publication Data

US 2010/0015455 A1 Jan. 21, 2010

(51) Int. Cl.
B29C 65/82 (2006.01)

(52) U.S. Cl. .......... 156/64; 156/247; 156/350; 156/378; 156/379; 156/701; 156/705; 156/714; 156/718; 156/719; 73/150 A; 73/826; 73/827; 73/841; 73/842; 73/845

(58) Field of Classification Search ............... 156/64, 156/350, 378, 379, 701, 705, 714, 718, 719; 73/150 A, 826, 827, 841, 842, 845

See application file for complete search history.

(56) References Cited

U.S. PATENT DOCUMENTS

| 3,577,775 | A | | 5/1971 | Henderson |
| 4,002,060 | A | | 1/1977 | Ogata et al. |
| 4,538,462 | A | * | 9/1985 | Hartog et al. ........... 73/577 |
| 4,899,581 | A | | 2/1990 | Allen et al. |
| 5,160,780 | A | * | 11/1992 | Ono et al. ........... 428/220 |
| 5,176,028 | A | | 1/1993 | Humphrey |
| 5,432,435 | A | * | 7/1995 | Strong et al. ........... 324/71.1 |
| 6,026,680 | A | * | 2/2000 | Mann ........... 73/150 R |
| 6,800,156 | B2 | | 10/2004 | Dietz et al. |
| 7,028,555 | B1 | | 4/2006 | Logan et al. |
| 7,083,327 | B1 | | 8/2006 | Shepard |
| 2007/0092372 | A1 | | 4/2007 | Carroll et al. |
| 2008/0026142 | A1 | | 1/2008 | Vontell et al. |
| 2008/0041842 | A1 | | 2/2008 | Alexander et al. |
| 2008/0053106 | A1 | | 3/2008 | Vontell |

* cited by examiner

Primary Examiner — Katarzyna Wyrozebski Lee
Assistant Examiner — Joshel Rivera
(74) Attorney, Agent, or Firm — Kinney & Lange, P.A.

(57) ABSTRACT

A method includes positioning a layer of adhesive between a first structural component and a second structural component, positioning a first evaluation film between the first structural component and the layer of adhesive, curing the adhesive at least partially, separating the first structural component and the first evaluation film by a relative movement therebetween, and inspecting bond line quality of the adhesive.

20 Claims, 4 Drawing Sheets

METHOD AND ASSEMBLY FOR VALIDATING BOND LINE

STATEMENT OF GOVERNMENT INTEREST

The present invention was developed, at least in part, with government funding, under Contract No. N00019-02-C-3003 awarded by the United States Navy. The U.S. Government has certain rights in this invention.

BACKGROUND

The present invention relates to methods and assemblies for validating adhesive bond lines.

Modular components can be bonded together using adhesives. For instance, gas turbine engines can utilize modular components made of composite materials that are bonded together using adhesives, which can be removable adhesives in order to facilitate replacement or repair of the modular components. Many adhesives are cured through the application of temperature and/or pressure. The quality of a bond line formed by adhering components together often must be validated, such as during the configuration of manufacturing facilities and techniques for production as well as for quality control or diagnostic purposes later. These validations help ensure that adhesive bond lines will perform as desired.

Validation of adhesive bond lines can be performed using destructive testing. Destruction of the adhered parts is often necessary, because the adhesive bond line may not be sufficiently exposed to permit evaluation. However, destructive testing is often undesirable, because modular components are often expensive and scarce. For example, during the design phases prior full production of a given modular assembly, prototype or test components may be difficult to procure, or otherwise unavailable within a suitable time frame for destructive testing to be feasible.

Moreover, test equipment that can survive high temperature adhesive curing conditions may be expensive, or unavailable. For example, pressure sensitive films are also known for allowing optical analysis of pressure distributions. However, these films are generally not suitable for use at elevated temperatures, and therefore are not helpful for evaluating bond lines with adhesives cured at elevated temperatures.

Thus, an alternative validation method and apparatus is desired.

SUMMARY

A method includes positioning a layer of adhesive between a first structural component and a second structural component, positioning a first evaluation film between the first structural component and the layer of adhesive, curing the adhesive at least partially, separating the first structural component and the first evaluation film by a relative movement therebetween, and inspecting bond line quality of the adhesive.

An assembly includes a first structural component, a second structural component, a layer of adhesive curable at an elevated temperature located between the first and second structural components, and a first evaluation film located between and in contact with the first structural component and the layer of adhesive. The evaluation film is transparent or translucent and configured to be removable from the first structural component.

DETAILED DESCRIPTION

In general, the present invention relates to an adhesive bond line validation method and apparatus that reduces or eliminates a need to destroy bonded structural components during validation testing. Evaluation films can be placed along one or more surfaces of an adhesive layer, in between structural components desired to be bonded. The evaluation films can define barriers between the adhesive layer and the structural components, such that when the adhesive layer is at least partially cured, there is essentially no adhesion to the structural components where the evaluation films were placed. The structural components can be separated without damage, and a bond line formed by the cured or partially cured adhesive layer, along with the one or more evaluation films, can be removed for inspection. In one embodiment, the evaluation films are transparent or translucent, allowing visual inspection therethrough. The evaluation films can optionally be separated from the bond line formed by the cured or partially cured adhesive layer for further inspection, such as thickness distribution analysis. Results of inspection of the bond line can be used to adjust process parameters, such as heat and/or pressure applied to cure the adhesive, and the validation process repeated as necessary until bond lines meet desired specifications.

Figure 1:
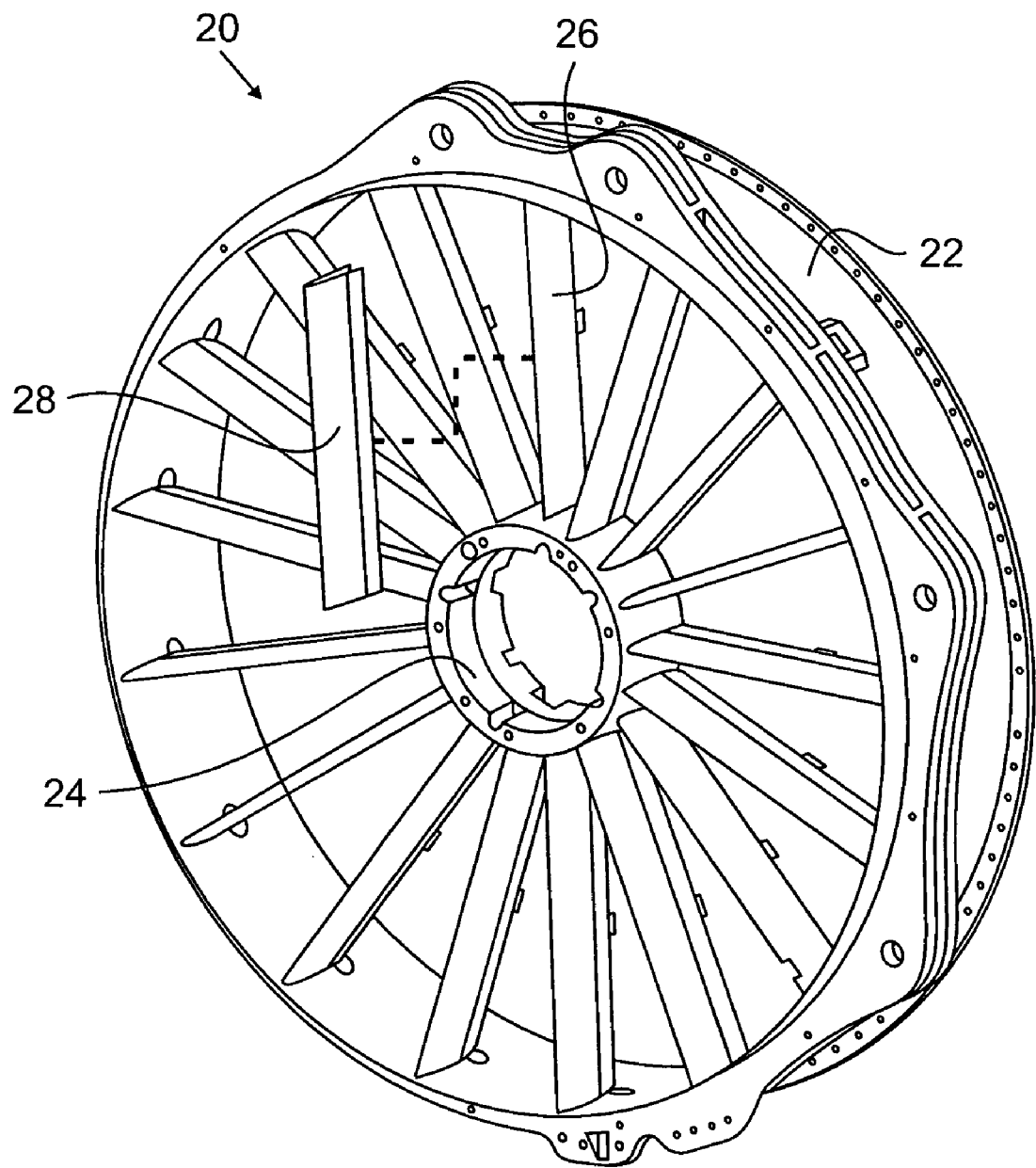
FIG. 1 is an exploded perspective view of an inlet case assembly for a gas turbine engine.

FIG. 1 is an exploded perspective view of an inlet case assembly 20 for a gas turbine engine (not shown). The inlet case assembly 20 can be configured as a static (i.e., non-rotating) assembly that includes an outer diameter (OD) ring 22, an inner diameter (ID) ring 24, a plurality of struts 26 (only one strut 26 is labeled in FIG. 1) extending between the OD ring 22 and the ID ring 24 in a cascade configuration, and a plurality of fan inlet strut fairings (FISFs) 28 (only one FISF 28 is labeled in FIG. 1) each secured to one of the struts 26. In the illustrated embodiment, the OD ring 22, the ID ring 24 and the struts 26 of the inlet case assembly 20 are integrally formed from composite material, or other suitable materials. The FISFs 28 are modular components that can be removably secured to each of the struts 26 with adhesive. In the illustrated embodiment, the FISFs 28 are generally V-shaped structures, made of composite material or other suitable materials, secured with adhesive to sidewalls of the struts 26 so as to generally surround leading edges of each of the struts 26. The use of the FISFs 28 helps protect the struts 26 during engine operation, while allowing the FISFs 28 to be relatively easily removed for repair or replacement. The struts 26 and the FISFs 28 are referred to herein as structural components.

Figure 2:
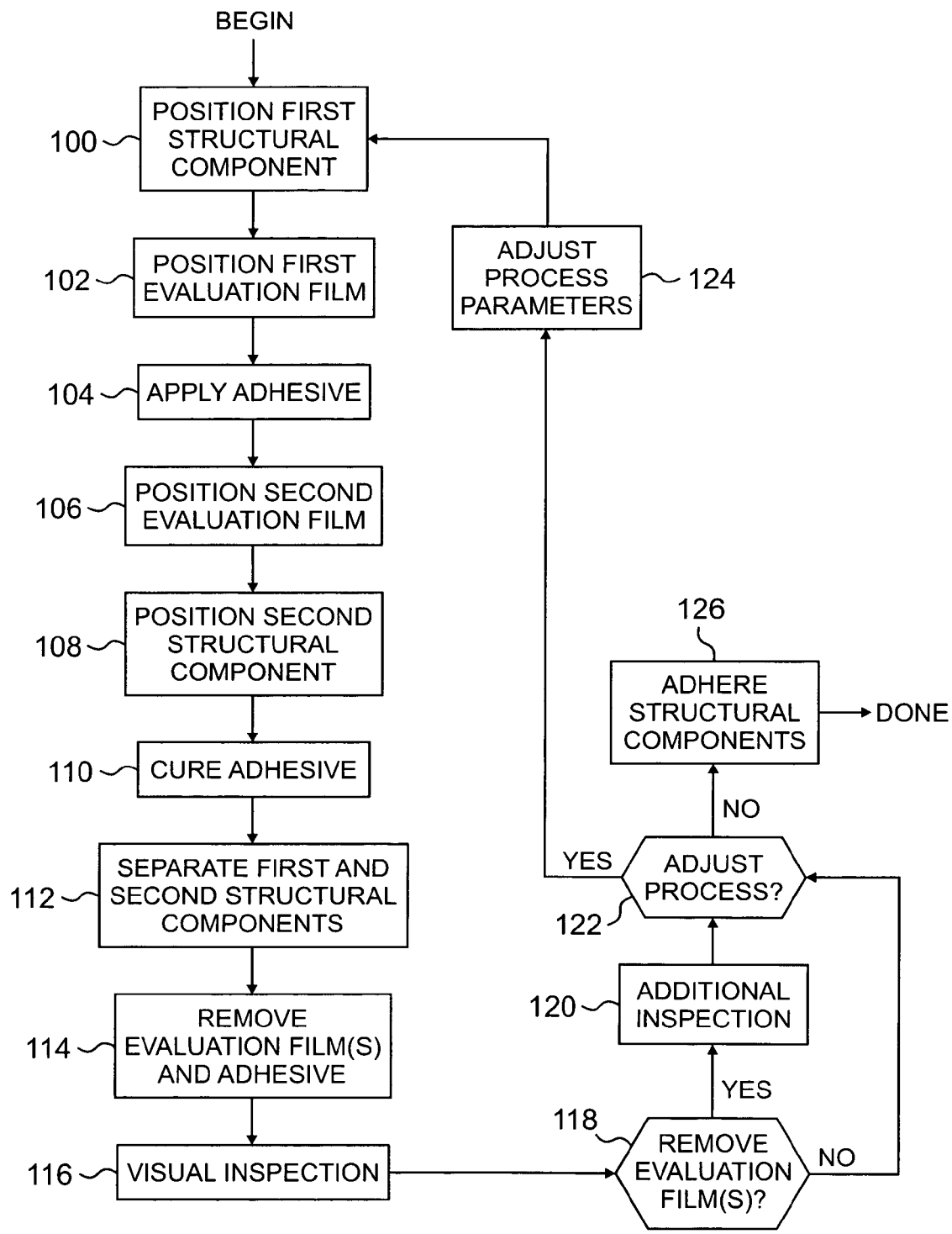
FIG. 2 is a flow chart of a bond line validation method according to the present invention.

FIG. 2 is a flow chart of an exemplary bond line validation method. Initially, a first structural component (e.g., a strut 26 or FISF 28), is positioned for bonding (step 100). Next, a first evaluation film is positioned adjacent to the first structural component at a desired bond line location (step 102) and a layer of adhesive is applied onto the first evaluation film (step 104). The method of application of the layer of adhesive can generally follow a desired production method, that is using tooling and procedures that are intended to normally be used for applying adhesive to the first structural component during production—apart from bond line validation. Applying the layer of adhesive can include removal of backing liners present on the adhesive prior to application. A second evaluation film can then be positioned on the layer of adhesive (step 106), and the second structural component can be positioned adjacent to the second evaluation film (step 108). The first and second evaluation films can form barriers between the first and second structural components, respectively, and the layer of adhesive. In one embodiment, the first and second evaluation films can be positioned at opposite sides of the layer of adhesive and prevent contact between the layer of adhesive and the first and second structural components. In alternative embodiments, the order of the foregoing method steps can be altered, and additional steps not specifically mentioned herein can also be performed. Moreover, in further alternative embodiments, one of the evaluation films can be omitted, or a portion of the layer of adhesive can be placed in contact with a structural component, such that the layer of adhesive can contact one of the structural components.

Next, the layer of adhesive is at least partially cured to form a bond line (step 110). Curing can involve the application of heat and/or pressure. For example, the first and second structural components, along with the layer of adhesive and evaluation films, can be clamped together with a suitable pressure application device, and the clamped items all placed in an oven. However, it should be understood that the particular methods of curing the layer of adhesive will vary as a function of the particular adhesive used. In general, process of curing the layer of adhesive can generally follow a desired production method.

Once the layer of adhesive has cured as desired, the first and second structural components can be separated (step 112). This step can avoid damage to or destruction of the first and second structural components because of the presence of the evaluations films, which can act as barriers between the first and second structural components and the layer of adhesive. The layer of adhesive and the first and/or second evaluation films adhered thereto can then be removed (step 114). The curing step generally adheres the layer of adhesive to the first and second evaluation films, which allows the layer of adhesive and the evaluation films to be relatively easily removed simultaneously by hand or with suitable tools. With some types of adhesive, such as a calendared silicone adhesive, the cured layer of adhesive is generally stable and flexible enough to be moved and handled, with care, thereby assisting with later inspections or evaluations of the bond line.

The first and/or second evaluation films can be transparent or translucent, which can allow for visual (or optical) inspection of the bond line formed by the layer of adhesive during the curing step through the evaluation films (step 116). This visual analysis can include identification of voids, wrinkles or other known conditions associated with bond line defects, and provide an optical analysis of pressure distribution.

Other inspections of the bond line can also be performed, as desired. A decision can be made to remove the first and/or second evaluation films from the layer (step 118). If desired, one or more additional inspections can be performed (step 120), such as thickness distribution measurement/analysis, hardness testing, adhesive flow analysis, further visual analysis, tensile strength testing, tear strength testing, differential scanning calorimetry (DSC), thermogravametric analysis (TGA), thermo-mechanical analysis (TMA), rheology, or any other known inspection procedures, including destructive testing of the layer of adhesive. Removal of the evaluation films can allow certain forms of inspection that might not otherwise be possible due to the presence of the evaluation films. The evaluation films can be configured to allow for relatively easy removal from the layer of adhesive after curing, as discussed further below. It should be noted that in alternative embodiments, the visual inspection of step 116 can be omitted and bond line inspection performed only after removal of the evaluation films.

After inspection is complete, an analysis can be made as to whether the bonding process should be adjusted (step 122). At this step, results of bond line inspections can be analyzed and compared to desired results. One or more process parameters, such as temperature and pressure profiles applied during adhesive curing, can be adjusted (step 124), and the validation process begun again at step 100. In this sense, the validation process allows an empirical determination of the efficacy of process procedures, through an iterative testing process. Destruction of structural components, which may be expensive and scarce, is not required. If no adjustments are desired, then the bonding process can be performed using the validated process, without the use of the evaluation films, in order to adhere the first and second structural components together (step 126).

Figure 3:
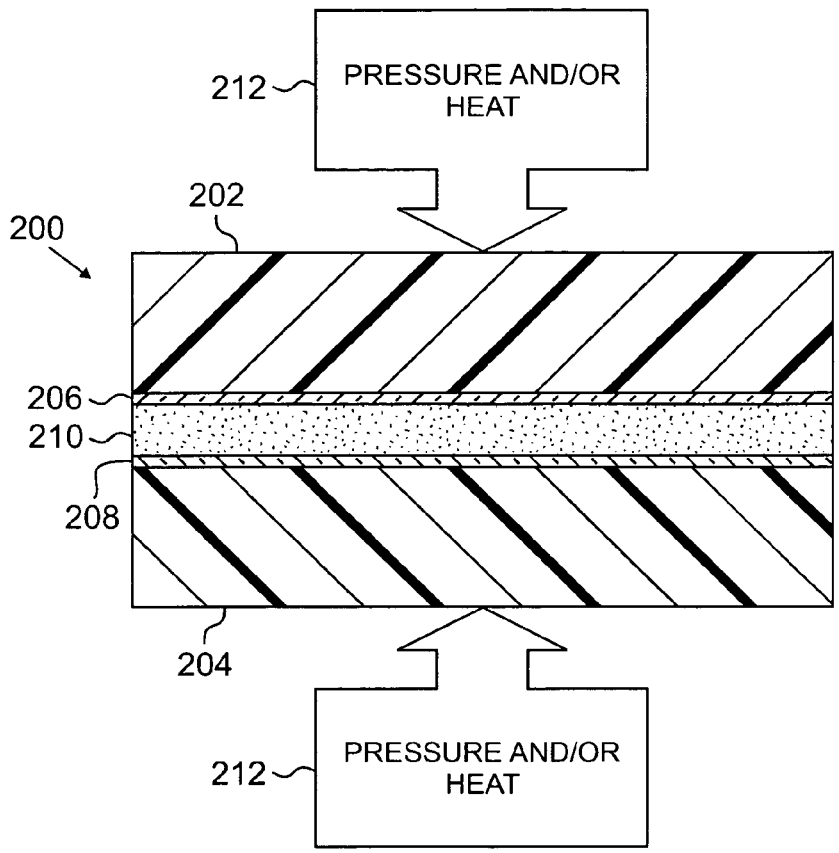
FIG. 3 is a cross-sectional view of a bond line validation assembly according to the present invention.

FIG. 3 is a cross-sectional view of a bond line validation assembly 200 that includes a first structural component 202, a second structural component 204, a first evaluation film 206, a second evaluation film 208, and a layer of adhesive 210. The application of pressure and/or heat is shown schematically in FIG. 3 by boxes 212. The first and second structural components 202 and 204 can be any components desired to be adhered together (e.g., the struts 26 and FISFs 28 discussed above). As shown in FIG. 3, the first and second structural components 202 and 204 are generally rectangular in cross-section, and have generally planar bonding faces. However, the illustrated embodiment is provided merely by way of example, and not limitation. It should be understood that the shape and configuration of the first and second structural components 202 and 204 can vary, and can define nonplanar bonding faces.

The adhesive in layer 210 can be a heat and/or pressure curable adhesive of a type disclosed in commonly-assigned U.S. Pat. App. Pub. No. 2008/0026142, entitled "Removable Adhesive For Replaceable Components Subjected To Impact Loads" (e.g., a calendared silicone adhesive), expoxy, polyimid, bismaleimide, urethane, fluoropolymer, elastomer, or another type of adhesive suitable for a desired application. A thickness of the layer of adhesive 210 can vary as desired for particular applications. In one embodiment, the layer of adhesive 210 is approximately 0.127 mm (0.005 inch) or more thick.

The first and second evaluation films 206 and 208 can each be thin, substantially transparent or translucent films, such as those made from a polyimide material (e.g., Kapton® film, available from E. I. Du Pont De Nemours and Co. Corp., Wilmington, Del.), a perfluoroalkoxy (PFA) material, Teflon®-like flouropolymers (e.g., polytetrafluoroethylene (PTFA) and fluorinated ethylene-propylene (FEP)), fluorinated films, etc. The first and second evaluation films 206 and 208 should be sufficiently translucent to allow visual inspection, if visual inspection is desired. A thickness of the first and second evaluation films 206 and 208 can vary as desired, and will generally relate to the thickness of the layer of adhesive 210 and geometries of the first and second structural components 202 and 204. However, it is generally desirable for the first and second evaluation films 206 and 208 to be as thin as possible. In one embodiment, the first and second evaluation films 206 and 208 can be approximately 0.5-10 mils thick, or alternatively approximately 1-2 mils thick. It is also generally desirable for the first and second evaluation films 206 and 208 to be able to withstand adhesive process (e.g., curing) conditions, such as elevated temperatures (e.g., approximately 120-

316° C. (250-600° F.) or more) and pressures (e.g., approximately 690 kilopascals (100 psi) or more), and exhibit insignificant dimensional change under adhesive processing conditions (e.g., less than or equal to a 5% change in thickness per evaluation film). Particular materials for the first and second evaluation films 206 and 208 can be selected according to the particular processing conditions for a given composition of the layer of adhesive 210.

In one embodiment, the composition of the first and second evaluation films 206 and 208 can be selected to reduce or eliminate interference with the cure chemistry of the layer of adhesive 210, in order to promote full curing of the layer of adhesive 210 during bond line validation. Kapton® films and PFA films, for example, are generally inert with respect to the curing of calendared silicone adhesives. Alternatively, the composition of the first and second evaluation films 206 and 208 can be selected to interfere with the cure chemistry of the layer of adhesive 210, in order to prevent full curing of the layer of adhesive 210 during bond line validation and thereby allow inspection of adhesive flow, etc. prior to full curing. Fluorinated films, for example, can inhibit or otherwise affect curing of calendared silicone adhesives.

Figure 4:
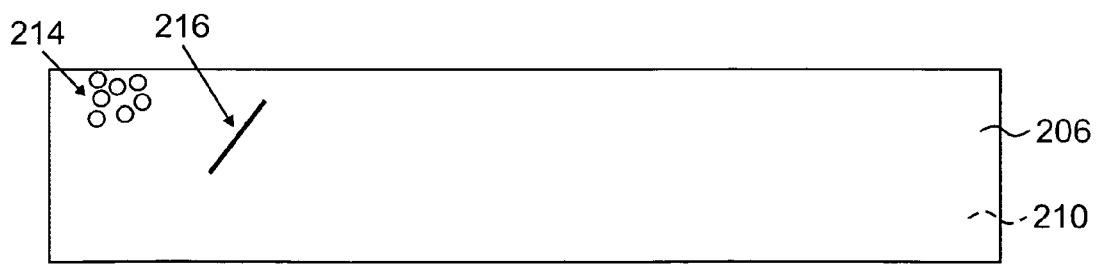
FIG. 4 is a plan view of a portion of the bond line validation assembly of FIG. 3.

FIG. 4 is a plan view of a portion of the bond line validation assembly 200. As shown in FIG. 4, voids 214 and a wrinkle 216 are defects visible in the bond line formed by the cured layer of adhesive 210 through the substantially transparent first evaluation film 206. The presence of defects, such as the voids 214 and the wrinkle 216, can suggest adjustments to adhesive processing parameters.

Figure 5:
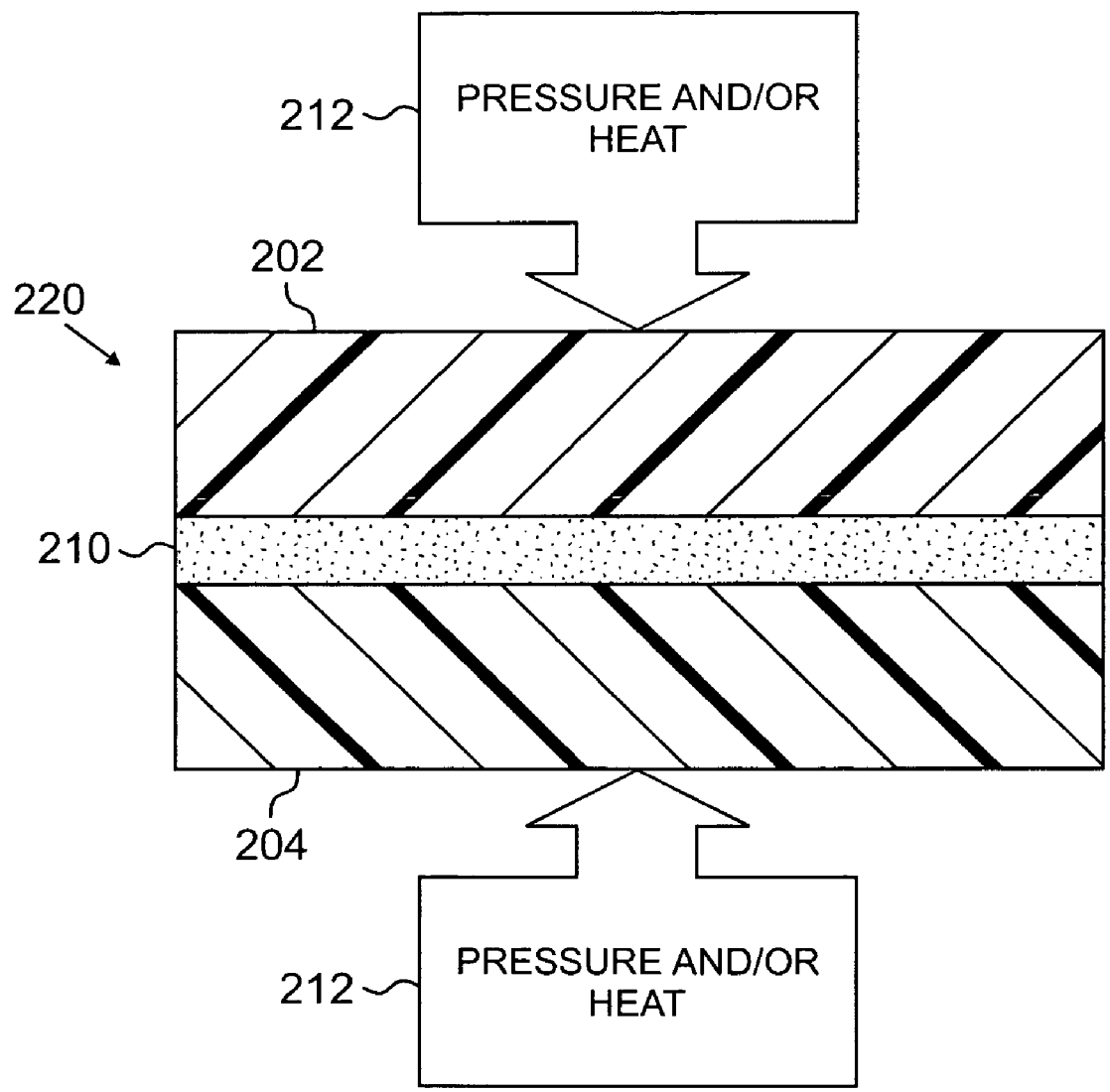
FIG. 5 is a cross-sectional view of a bonded assembly, post-validation.

FIG. 5 is a cross-sectional view of a bonded assembly 220, post-validation. As shown in the illustrated embodiment, the first and second structural components 202 and 204 are bonded together by the layer of adhesive 210, which is cured through the application of pressure and/or temperature (shown schematically by the boxes 212).

It should be recognized that the present invention provides numerous advantages. For example, the present invention provides an essentially non-destructive adhesive bond line validation method and apparatus that can help promote desired bond line characteristics, for diagnostics, quality control analyses, etc. The present invention can also be used in conjunction with existing production tooling and procedures. Furthermore, adhesive and evaluation films used for validation according to the present invention are generally inexpensive, meaning that destruction of those materials for bond line validation can be cost-effective for most applications.

Although the present invention has been described with reference to preferred embodiments, workers skilled in the art will recognize that changes may be made in form and detail without departing from the spirit and scope of the invention. For instance, the composition of the adhesive and the adhesive curing techniques utilized with the present invention can vary as desired for particular applications.

The invention claimed is:

1. A method comprising:
   positioning a layer of adhesive between a first structural component and a second structural component between which an adhesive bond is intended;
   positioning a first evaluation film between and in contact with the first structural component and the layer of adhesive, wherein the first evaluation film provides a barrier to any adhesion between the layer of adhesive and the first structural component;
   curing the adhesive at least partially;
   separating the first structural component and the first evaluation film, by a relative movement therebetween; and
   inspecting bond line quality of the adhesive.

2. The method of claim 1 and further comprising:
   removing the first evaluation film from the adhesive.

3. The method of claim 1 and further comprising:
   positioning a second evaluation film between the second structural component and the layer of adhesive prior to curing the adhesive at least partially.

4. The method of claim 3 and further comprising:
   separating the second structural component from the second evaluation film, by a relative movement therebetween.

5. The method of claim 4 and further comprising:
   removing the second evaluation film from the adhesive.

6. The method of claim 5 and further comprising:
   removing the first evaluation film from the adhesive.

7. The method of claim 1, wherein the first evaluation film comprises a material that is substantially inert with respect to curing of the adhesive.

8. The method of claim 1, wherein the adhesive is fully cured.

9. The method of claim 1, wherein the adhesive is only partially cured, and wherein the step of inspecting bond line quality of the adhesive comprises evaluation of adhesive flow.

10. The method of claim 1, wherein the step of inspecting bond line quality of the adhesive comprises a visual inspection for defects.

11. The method of claim 1, wherein the step of inspecting bond line quality of the adhesive comprises thickness measurement.

12. The method of claim 1, wherein curing the adhesive comprises:
    applying heat to the adhesive; and
    applying pressure to the adhesive.

13. The method of claim 12, wherein heat is applied to the adhesive at or above approximately 65° C. (150° F.).

14. The method of claim 1, wherein the adhesive comprises a removable silicone-based material.

15. An assembly comprising:
    a first structural component;
    a second structural component;
    a layer of adhesive located between the first and second structural components, wherein the adhesive is curable at an elevated temperature; and
    a first evaluation film located between and in contact with the first structural component and the layer of adhesive, wherein the evaluation film is transparent or translucent and configured to be removable from the first structural component, and wherein the first evaluation film provides a barrier between the layer of adhesive and the first structural component such that the layer of adhesive does not physically contact the first structural component.

16. The assembly of claim 15, wherein the first evaluation film comprises a material selected from the group consisting of a polyimide material and a perfluoroalkoxy material.

17. The assembly of claim 15 and further comprising:
    a second evaluation film located between and in contact with the second structural component and the layer of adhesive, wherein the evaluation film is transparent or translucent and configured to be removable from the second structural component.

18. The assembly of claim 15, wherein the adhesive comprises a calendared silicone-based material.

19. A method comprising:
positioning a layer of adhesive between a first structural component and a second structural component;
positioning a first evaluation film between and in contact with the first structural component and the layer of adhesive;
curing the adhesive at least partially;
separating the first structural component and the first evaluation film, by a relative movement therebetween; and
inspecting bond line quality of the adhesive at an inspection location aligned with a location of physical contact between the adhesive and the first evaluation film.

20. The method of claim 19, wherein the step of inspecting bond line quality of the adhesive comprises a visual inspection through the first evaluation film.

* * * * *